Oct. 11, 1960  J. W. McDUFFIE  2,955,405
HAY BALER WITH PICK-UP LATCHING MEANS
Filed Sept. 16, 1957

INVENTOR
JAMES W. McDUFFIE
Joseph Allen Brown
ATTORNEY

2,955,405
HAY BALER WITH PICK-UP LATCHING MEANS

James W. McDuffie, New Holland, Pa., assignor to Sperry Rand Corporation, New Holland, Pa., a corporation of Delaware Filed Sept. 16, 1957, Ser. No. 684,312

7 Claims. (Cl. 56—341)

The present invention relates to hay balers of the type having a fore-and-aft extending bale chamber and a laterally projecting pick-up and feeder mechanism. More particularly, the invention relates to an improved mechanism for latching the pick-up in an elevated inoperative position and for unlatching the pick-up to allow it to drop to a lower elevation and operative position.

One object of this invention is to provide a latch mechanism adjacent the end of the pick-up proximate to the bale chamber, and a control means therefor operable from the end of the pick-up remote from the bale chamber.

Another object of this invention is to provide a latch mechanism of the character described which may automatically latch the pick-up in an elevated position when the pick-up has been raised to a predetermined point.

Another object of this invention is to provide, in a latch mechanism of the character described, releasable means for locking the mechanism in inoperative position whereby when the baler is in operation the pick-up may not become inadvertently locked in an elevated position.

Another object of this invention is to provide a latch mechanism which includes adjustable means whereby movement of the baler pick-up downwardly may be variably limited.

A further object of this invention is to provide in a baler a pick-up latch mechanism which comprises simple parts easily fabricated and assembled, thereby rendering the cost of the mechanism small.

Other objects of this invention will be apparent hereinafter from the specification and from the recital in the appended claims.

Figure 1:
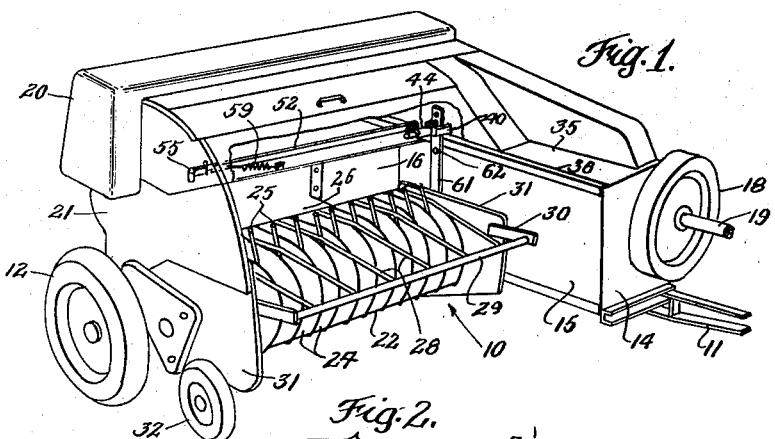
Fig. 1 is a perspective view of a hay baler having a latch mechanism for locking the pick-up in an elevated position, such mechanism being constructed according to one embodiment of this invention.

Referring now to the drawings by numerals of reference, 10 denotes generally a mobile hay baler connectable through a tongue 11 to a tractor or other vehicle whereby the baler may be towed across a field. The baler is supported on a pair of laterally spaced, rearwardly disposed, ground wheels, one of which 12 is shown. Extending in a fore-and-aft direction is a bale chamber 14 which is generally rectangular in cross-section. Bale chamber 14 has a vertical side wall 15 provided with a feed opening 16 through which crop material may be fed into the bale chamber. Reciprocable in chamber 14 is a plunger, not shown, which compresses the hay delivered into the bale chamber into bales. Such plunger may be reciprocated by a drive connection to the tractor through a fly-wheel 18 and drive shaft 19.

Extending between ground wheels 12 and transversely relative to the extension of the bale chamber 14 is a feeder mechanism contained in housing 20. Such mechanism may be of any conventional structure operable to deliver hay through the opening 16 and into the bale chamber. The feeder mechanism housing includes a forwardly projecting side plate 21 which extends vertically and in spaced parallel relationship to the side wall 15 of the bale chamber 14. Disposed between side walls 15 and plate 21 is a pick-up 22 of conventional construction mounted for vertical movement between the bale chamber side and the feeder plate.

The pick-up may be constructed as shown, for exmple, in U.S. Patent No. 2,757,602 issued August 7, 1956. It comprises a plurality of arcuate stripper members 24 between which feed fingers 25 pass. The feed fingers move forwardly, then upwardly and then rearwardly to elevate cut crop material on the ground and deposit such material on a feed platform 26 rearwardly of the pick-up and beneath feeder mechanism 20. The feeder then moves the material across the feed platform, through opening 16 and into the bale chamber.

The pick-up is provided with rearwardly extending windguard rods 28 mounted on a cross-bar 29 supported by bracket members 30 on side plates 31 on the pick-up. The side plates 31 are fixed relative to the remainder of the pick-up whereby the pick-up, including these sides, moves vertically as a unit. The side plate 31 remote from the bale chamber has a feeler-wheel 32 which engages the ground and causes the pick-up to float up and down responsive to variations in the ground over which the baler travels.

The structure just recited is conventional and plays no part in the present invention other than to provide the environment in which the invention is used. In Fig. 1 the pick-up is shown in a down position. When the operator of the baler wants to have the pick-up in elevated position, for example when he has finished baling and desires to return the baler to a storage place, he may manually lift the pick-up by grasping the cross-bar 29 for the windguards and lifting. The pick-up, which is conventionally mounted for pivotal movement about an axis close to and parallel to the axis of wheels 12, will be elevated between the side wall 15 of the bale chamber and the forwardly projecting side plate 21 on the feeder housing. Mechanism is provided for locking the pick-up when it has been elevated a predetermined amount. Such mechanism will now be described.

Figure 2:
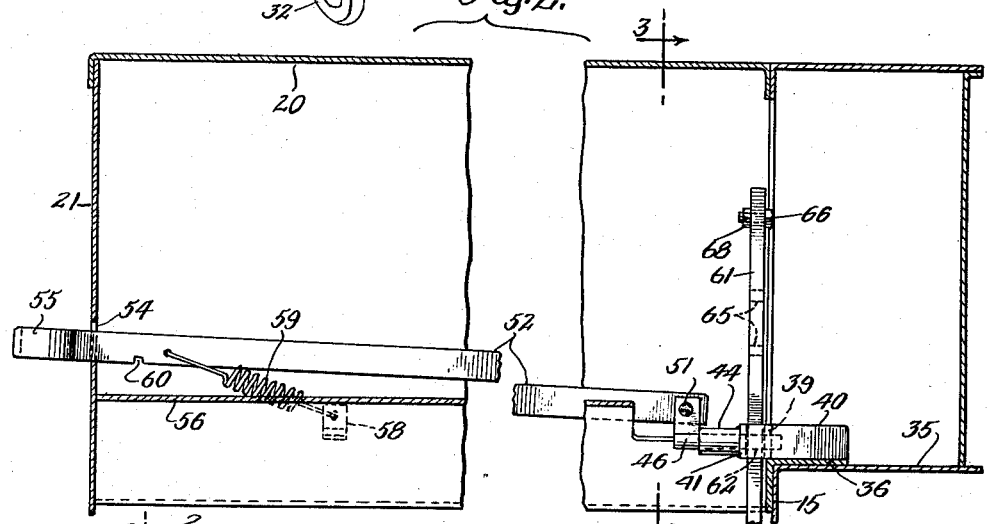
Fig. 2 is a fragmentary, sectional view, on an enlarged scale, showing the latch mechanism in a position wherein the baler pick-up is locked in elevated position, such section being taken on the lines 2—2 of Fig. 3 looking in the direction of the arrows.
Figure 3:
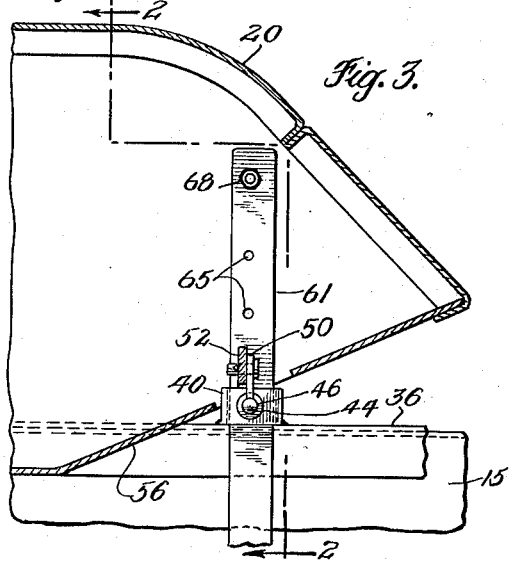
Fig. 3 is a section taken on the line 3—3 of Fig. 2 and looking in the direction of the arrow.
Figure 5:
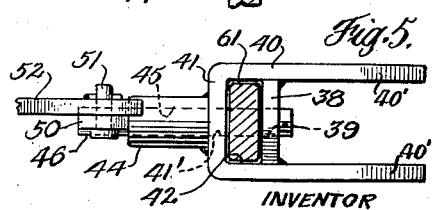
Fig. 5 is a plan view of Fig. 4.

Bale case 14 has a top wall 35. An angle bracket 36 is disposed on the corner of the bale case formed by the side wall 15 and top wall 35, one leg of the bracket engaging the top wall and the other the side wall (Fig. 2). Angle bracket 36 is welded or otherwise secured rigidly in place. Affixed on top of this bracket is a vertically extending latching member 38 having a bore 39 the axis of which is transverse to the extension of the bale chamber and parallel to the axis of the pick-up. It is straddled by a horizontal U-shaped bracket 40 also connected to angle iron 36 (Fig. 5). The legs 40' of the U extend toward the bale case while the bight 41 thereof is on the side of the bale case towards the pick-up and spaced from latch member 38 to thereby provide a space 42, as shown best in Fig. 5. The latch element 38 is also affixed to this U-shaped bracket. Bight 41 has a hole 41' aligned with the hole 39 in the latch member.

Figure 4:
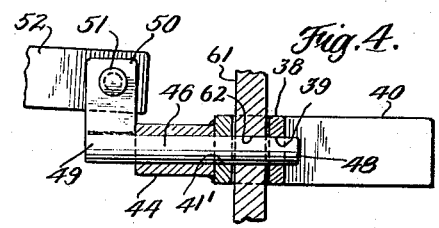
Fig. 4 is an enlarged fragmentary part side elevation, part section of the latching mechanism of this invention.

Welded to the outer face of bight 41 is a sleeve or bearing 44 the bore 45 of which is coaxial with the holes 39 and 41'. Reciprocable in sleeve 44 is a latch pin 46. The pin is of such length that it extends completely through sleeve 44 having an end 48 adapted to project on one side of the sleeve and an end 49 adapted to project on the opposite side of the sleeve. As shown in Fig. 4, the latch pin is extendable through hole 41' and then through the hole 39 in the latch member 38.

The end 49 of the pin has an ear 50 welded to it. Ear 50 extends laterally relative to the axis of the pin and it is provided with a pivot pin 51. Connected to pivot pin 51 is one end of a control rod 52 the opposite end of which extends through a hole 54 in side plate 21 of feeder housing 20. Control rod 52 has a handle 55 at its outer end. The rod extends above a downwardly and rearwardly inclined plate 56 which forms part of the housing for the feeder mechanism. Connected to plate 56 is a bracket 58 to which one end of a spring 59 is connected. Spring 59 extends from bracket 58 toward side plate 21 and is connected to the control rod. It will be apparent from Fig. 2 that the spring 59 constantly urges the control rod toward the bale chamber. The control rod has a notch 60 in its lower edge adapted to operatively engage the edge of side plate 21 around the hole 54 to lock the control rod 52 in outwardly extended position for a reason hereinafter described.

Adjacent side wall 15 and extending vertically and parallel thereto is a latch bar 61 which is suitably pivotally connected adjacent its lower end by a means, not shown, to the adjacent end of the pick-up. Latch bar 61 extends upwardly and through the space, there being considerable clearance between bar 61 and bracket 40 (Fig. 5). The latch bar has a hole 62 of substantially the same size as the holes 39 and 41' and adapted to receive pin 46. The length of the latch bar is such that whether the pick-up is in lower operative position or elevated inoperative position the latch bar will still extend through the bracket 40. Further, the transverse axis about which the pick-up is pivotal is so disposed that when the pick-up is raised or lowered, the fore-and-aft movement imparted to the latch bar is practically negligible. The clearance or "slop" between the latch bar and bracket 40 prevents binding.

Assume that the pick-up is in up, latched position, as shown in Fig. 2, with the pin 46 projecting through the hole 62 in latch bar 61 and through the holes 39 and 41' in latch member 38 and bracket 40, respectively. All that the operator has to do to lower the pick-up is to grasp the handle 55 and pull control rod 52 outwardly. This will withdraw the pin 46 from latch member 38 and then from the latch bar 61. The pick-up may then drop downwardly by gravity. To maintain pin 46 in withdrawn position, the control rod 52 may be held in pulled or extended position by bringing the notch 60 in the control rod into cooperative relation with the side plate 21 of the feeder mechanism. In such position, the spring 59 will be extended, thereby tending to move the control rod toward the bale case. However, such will be prevented because of the connection of the control rod with the side plate 21.

When the baler is in operation, the pick-up may float vertically relatively to the side wall 15 of the bale chamber and the plate 21 of the feeder responsive to ground variations encountered by wheel 32. Latch bar 61 will move up and down with the pick-up. Even though hole 62 passes pin 46, the pick-up will not be latched in an elevated position provided the control rod 52 is hooked on side wall 21. Further, the end 48 of pin 46 will be retracted into sleeve 41 and out of engagement with the side of the latch bar thereby saving both the pin and latch bar from wear because of the relative movement of one to the other.

When the baler operator wishes to elevate the pick-up to a permanent, inoperative position, he merely unlatches the control rod by lifting handle 55. Once the side plate 21 is free of the notch 60, spring 59 may become effective to shift the control rod 52 and latch pin 46 towards the bale chamber. The end 48 of the pin toward the bale chamber will now abut against the side of vertical latch bar 61. The operator may then grasp the cross-bar 29 and lift the pick-up. When the hole 62 in the latch bar comes into register with holes 39 and 41' pin 46 will snap through the respective holes under the urging of the spring 59 and lock latch bar 61 against downward movement and thereby latch the pick-up in elevated position. When the operator wishes to drop the pick-up he will merely grasp the handle 55, as previously stated, and pull the control rod thereby retracting the pin 46.

In some instances, when the baler is being operated and the pick-up is down, the pick-up may come to a place in the field which is at a much lower elevation than the ground on which the support wheels 12 are riding. In such case, the pick-up will drop downwardly. To insure against the pick-up dropping further than is desirable, support bar 61 has a plurality of holes 65 each of which is smaller in diameter than the hole 62. Since the holes 65 are smaller than the holes 62, pin 46 is unable to enter these holes. Selectively, one of these holes may be provided with a nut 66 and bolt 68. If there is a tendency of the pick-up to drop too far, the nut-bolt will engage the fixed latch member 38 thus limiting the downward movement of the pick-up. By moving the nut and bolt to one of the other holes in the latch bar will enable the operator to set the downward limit of the pick-up.

With the structure just described, the pick-up may be dropped merely by pulling the handle 55. The pick-up may be elevated and latched at a predetermined height by releasing the control rod 52 from plate 21 and then lifting the pick-up until the hole 62 in latch bar 61 comes into register with the holes 39 and 41'. When such point is reached the pin 46 will snap automatically through the respective holes and lock the pick-up in elevated position.

One advantage of the structure just described is that the pick-up is supported in elevated position at the bale chamber side. This is desirable since it provides a more rigid structure for supporting the pick-up, such structure not being available on the side of the pick-up adjacent the plate 21. Moreover, the latching mechanism is controlled from adjacent the plate 21. Otherwise, the operator would have to climb over the windguards and the pick-up to get to the latching mechanism. With the structure which applicant employs, the controlling of the latch mechanism is readily accessible to the operator. Further, the entire structure comprises simple parts which are easily fabricated and inexpensive to assemble.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention and the limits of the appended claims.

Having thus described my invention, what I claim is:

1. An improvement in a hay baler having a fore-and-aft extending bale chamber having a vertical side wall, a feeder extending laterally from said side wall, said feeder having a forwardly projecting side plate generally parallel to said side wall and spaced therefrom, a pick-up supported for vertical movement between said side wall and said side plate, and means for latching said pick-up in an elevated inoperative position and for unlatching the pick-up whereby it may assume a lower elevation and operative position, the improvement residing in said latching means which comprises a fixed latching member connected to said bale chamber, said fixed latching member having a hole therein, a latch bar connected to said pick-up and extending adjacent said bale chamber and said fixed latching member, said latch bar being movable with said pick-up and having a hole therein registrable with said latching member hole when said pick-up is elevated to a predetermined position, a reciprocable pin projectable through both of said holes when said pick-up is in said elevated position for locking said pick-up in such position, a sleeve supported on said bale case spaced from said latching member in a direction toward said feeder plate, said sleeve having a bore which is aligned with the hole in said latching member, said pin being reciprocable in said sleeve, said latch bar extending in the space between said sleeve and latching member, means guiding the movement of said latch bar, and means extending from said feeder plate toward said bale chamber and connected to said pin for controlling the reciprocation of the pin in the sleeve.

2. An improvement in a hay baler having a fore-and-aft extending bale chamber having a vertical side wall, a feeder extending laterally from said side wall, said feeder having a forwardly projecting side plate generally parallel to said side wall and spaced therefrom, a pick-up supported for vertical movement between said side wall and said side plate, and means for latching said pick-up in an elevated inoperative position and for unlatching the pick-up whereby it may assume a lower elevation and operative position, the improvement residing in said latching means which comprises a fixed latching member connected to said bale chamber, said fixed latching member having a hole therein, a latch bar connected to said pick-up and extending adjacent said bale chamber and said fixed latching member, said latch bar being movable with said pick-up and having a hole therein registrable with said latching member hole when said pick-up is elevated to a predetermined position, a reciprocable pin projectable through both of said holes when said pick-up is elevated to said position for locking said pick-up in such position, a sleeve supported on said bale case spaced from said latching member in a direction toward said feeder plate, said sleeve having a bore which is aligned with the hole in said latching member, said pin being reciprocable in said sleeve, said latch bar extending in the space between said sleeve and latching member, means guiding the movement of said latch bar, and means adjacent said feeder plate for controlling the reciprocation of said pin, said controlling means comprising a control rod extending above said pick-up and having one end connected to said pin and an end opposite said one end extending through said feeder plate, said control rod being manually reciprocable to reciprocate said pin.

3. An improvement in a hay baler having a fore-and-aft extending bale chamber having a vertical side wall, a feeder extending laterally from said side wall, said feeder having a forwardly projecting side plate generally parallel to said side wall and spaced therefrom, a pick-up supported for vertical movement between said side wall and said plate, and means for latching said pick-up in an elevated inoperative position and for unlatching the pick-up whereby it may assume a lower elevation and operative position, the improvement residing in said latching means which comprises a fixed latching member connected to said bale chamber, said fixed latching member having a hole therein, a latch bar connected to said pick-up and extending adjacent said bale chamber and said fixed latching member, said latch bar being movable with said pick-up and having a hole therein registrable with said latching member hole when said pick-up is elevated to a predetermined position, a reciprocable pin projectable through both of said holes when said pick-up is in elevated position for locking said pick-up in such position, a sleeve supported on said bale case spaced from said latching member in a direction toward said feeder plate, said sleeve having a bore which is aligned with the hole in said latching member, said pin being reciprocable in said sleeve, said latch bar extending between said sleeve and latching member, means guiding the movement of said latch bar, and means adjacent said feeder plate for controlling the reciprocation of said pin, said controlling means comprising a control rod extending above said pick-up and having one end connected to said pin and an end opposite said one end extending through said feeder plate, said opposite end being formed with a handle by which said control rod may be manually reciprocated to reciprocate said pin, a spring having one end connected to said feeder and an opposite end connected to said control rod and constantly urging said control rod toward said bale chamber and the pin, controlled thereby, toward said fixed latching member, and means normally locking said control rod against movement by said spring.

4. An improvement in a hay baler having a fore-and-aft extending bale chamber having a vertical side wall, a feeder extending laterally from said side wall, said feeder having a forwardly projecting side plate generally parallel to said side wall and spaced therefrom, a pick-up supported for vertical movement between said side wall and side plate, and means for latching said pick-up in an elevated inoperative position and for unlatching the pick-up whereby it may assume a lower elevation and operative position, the improvement residing in said latching means which comprises a fixed latching member connected to said bale chamber, said fixed latching member extending vertically relative to said bale chamber and having a hole therein the axis of which is transverse to the fore-and-aft extension of said bale chamber, a horizontally extending U-shaped bracket the legs of which straddle said latching member and the bight of which is spaced from the latching member toward said side plate, a sleeve affixed to said bight and extending toward said side plate, said sleeve having a bore and said bight a hole coaxial with said latching member hole, a vertically extending latch bar having a lower end connected to said pick-up, said latch bar extending upwardly and through the space between said latching member and the bight of said U-shaped bracket and having a horizontally extending hole therethrough registrable with said latching member hole when said pick-up is elevated to a predetermined position, a pin reciprocable in said sleeve and projectable through the holes in said latch bar and latch member when said pick-up is in said predetermined position for locking said pick-up in such position, and means for reciprocating said pin, said means comprising a control rod extending generally horizontally above said pick-up and having one end pivotally connected to said pin and an end opposite said one end extending through said side plate, said opposite end being formed with a handle by which said control rod may be manually reciprocated to reciprocate said pin, means biasing said control rod and pin toward said bale chamber and latched position, and said control rod having a notch engageable with said side plate for locking said control rod against movement by said biasing means.

5. An improvement in a hay baler having a fore-and-aft extending bale chamber having a vertical side wall, a feeder extending laterally from said side wall, said feeder having a forwardly projecting side plate generally parallel to said side wall and spaced therefrom, a pick-up supported for vertical movement between said wall and side plate, and means for latching said pick-up in an elevated inoperative position and for unlatching the pick-up whereby it may assume a lower elevation and operative position, the impovement residing in said latching means which comprises a fixed latching member connected to said bale chamber, said fixed latching member having a hole therein, a vertically extending latch bar having a lower end connected to said pick-up and an upper end extending past said fixed latching element, said latch bar being movable up and down with said pick-up, means guiding the movement of said latch bar, said latch bar having a hole therein registrable with said latching member hole when said pick-up is elevated to a predetermined position, a reciprocable pin projectable through both of said holes when said pick-up is elevated to said position for locking said pick-up in such elevated position, a sleeve in which said pin is reciprocable, said sleeve being supported on said bale case spaced from said latching member in a direction toward said feeder plate, said sleeve having a bore aligned with the hole in said latching member, said latch bar extending between said sleeve and latching member, means adjacent said feeder plate for controlling the reciprocation of said pin, and adjustable means on said latch bar engageable with said fixed latching member for limiting the lowermost position which the pick-up may assume when in operative position.

6. An improvement in a hay baler having a fore-and-aft extending bale chamber having a vertical side wall, a feeder extending laterally from said side wall, said feeder having a forwardly projecting side plate generally parallel to said side wall and spaced therefrom, a pick-up supported for vertical movement between said wall and side plate, and means for latching said pick-up in an elevated inoperative position and for unlatching the pick-up whereby it may assume a lower elevattion and operative position, the improvement residing in said latching means which comprises a fixed latching member connected to said bale chamber, said fixed latching member having a hole therein, a vertically extending latch bar having a lower end connected to said pick-up and an upper end extending past said fixed latching element, said latch bar being movable up and down with said pick-up, means guiding the movement of said latch bar, said latch bar having a hole therein registrable with said latching member hole when said pick-up is elevated to a predetermined position, a reciprocable pin projectable through both of said holes when said pick-up is elevated to said position for locking said pick-up in such elevated position, a sleeve in which said pin is reciprocable, said sleeve being supported on said bale case spaced from said latching member in a direction toward said feeder plate, said sleeve having a bore aligned with the hole in said latching member, said latch bar extending between said sleeve and latching member, means adjacent said feeder plate for controlling the reciprocation of said pin, said latch bar having a series of vertically spaced openings each of which has a smaller diameter than the diameter of said latch bar hole, and means insertable, selectively, in one of said holes and extending outwardly therefrom and engageable with said latching member for variably limiting the lowermost position of said pick-up.

7. An improvement in a hay baler having a fore-and-aft extending bale chamber, a pick-up extending laterally of said bale chamber and supported on the baler for vertical movement relative to the bale chamber, and means operable to latch said pick-up in an elevated inoperative position and to unlatch the pick-up whereby it may assume a lower elevation and operative position, the improvement residing in said latch means and comprising a fixed latching member connected to said bale chamber, said fixed latching member having a hole therein, a latch bar connected to said pick-up and extending adjacent said bale chamber and said fixed latching member, said latch bar being movable vertically with said pick-up and having a hole therein registrable with said latching member hole when said pick-up is in a predetermined elevated position, a reciprocable pin projectable through both of said holes when said pick-up is in said elevated position for locking the pick-up in such position, a sleeve supported on said bale chamber and having a bore which is aligned with the hole in said latching member, said pin being reciprocable in said sleeve, means on said bale chamber guiding the vertical movements of said latch bar, spring means connected to said pin and biasing the pin toward said fixed latching member, and a handle connected to said pin for controlling the reciprocation of the pin in said sleeve.

References Cited in the file of this patent

UNITED STATES PATENTS

| | | |
|---|---|---|
| 543,226 | Atwood | July 23, 1895 |
| 1,181,311 | Huber et al. | May 2, 1916 |
| 2,268,713 | Luti | Jan. 5, 1942 |
| 2,430,734 | Raney et al. | Nov. 11, 1947 |
| 2,489,199 | Russell | Nov. 22, 1949 |
| 2,507,540 | Nolt | May 16, 1950 |
| 2,682,737 | Oehler et al. | July 6, 1954 |
| 2,751,745 | Magee | June 26, 1956 |

FOREIGN PATENTS

| | | |
|---|---|---|
| 576,471 | France | May 14, 1924 |